United States Patent
Lu et al.

(10) Patent No.: US 10,555,325 B2
(45) Date of Patent: Feb. 4, 2020

(54) NETWORK RESOURCE PRIORITIZATION FOR MOBILE TERMINATION SERVICES

(71) Applicant: VODAFONE GMBH, Duesseldorf (DE)

(72) Inventors: Yang Lu, Duesseldorf (DE); Peter Wild, Krefeld (DE); Peter Dawes, Swindon (GB)

(73) Assignee: VODAFONE GMBH, Duesseldorf (DE)

( * ) Notice: Subject to any disclaimer, the term of this patent is extended or adjusted under 35 U.S.C. 154(b) by 0 days.

(21) Appl. No.: 14/872,543

(22) Filed: Oct. 1, 2015

(65) Prior Publication Data

US 2016/0105901 A1   Apr. 14, 2016

(30) Foreign Application Priority Data

Oct. 8, 2014   (EP) .................................... 14188075

(51) Int. Cl.
| | |
|---|---|
| *H04L 5/14* | (2006.01) |
| *H04W 72/10* | (2009.01) |
| *H04W 28/16* | (2009.01) |
| *H04W 68/02* | (2009.01) |

(52) U.S. Cl.
CPC ............ *H04W 72/10* (2013.01); *H04W 28/16* (2013.01); *H04W 68/02* (2013.01)

(58) Field of Classification Search
None
See application file for complete search history.

(56) References Cited

U.S. PATENT DOCUMENTS

| | | | | |
|---|---|---|---|---|
| 2011/0295996 | A1* | 12/2011 | Qiu ......................... | G06F 9/505 709/224 |
| 2013/0201879 | A1* | 8/2013 | Varga .................. | H04L 61/2553 370/259 |
| 2013/0273876 | A1* | 10/2013 | Rasanen ........... | H04M 3/42153 455/404.1 |
| 2014/0068710 | A1* | 3/2014 | Lau ......................... | G06F 21/00 726/3 |

(Continued)

FOREIGN PATENT DOCUMENTS

| | | |
|---|---|---|
| EP | 2 501 199 | 9/2012 |
| EP | 2 523 524 | 11/2012 |
| EP | 2 536 178 | 12/2012 |

*Primary Examiner* — Bob A Phunkulh
(74) *Attorney, Agent, or Firm* — Grossman, Tucker, Perreault & Pfleger, PLLC (57) ABSTRACT

The invention relates to a method for enabling network resource prioritization of mobile terminating services of a user in a network, whereby the network comprises an evolved packet core network, an IP multimedia system network and at least one network element for aggregating information from messages transmitted in the network comprising the method steps receiving a request message via an interface of the network element, selecting a service information from the received request message, allocating a service type according to the selected service information, assigning a priority indicator for the allocated service type, converting the assigned priority indicator into a first identifier, creating a value by assembling the first identifier and a second identifier, and sending an answer message containing the created value via the interface.

15 Claims, 3 Drawing Sheets

(56) References Cited

U.S. PATENT DOCUMENTS

| | | | | |
|---|---|---|---|---|
| 2014/0185521 A1* | 7/2014 | Aksu | ............... | H04W 4/001 370/328 |
| 2014/0185526 A1* | 7/2014 | Aksu | ............... | H04W 4/001 370/328 |
| 2014/0301258 A1* | 10/2014 | Belghoul | ......... | H04W 52/0209 370/311 |
| 2014/0378105 A1* | 12/2014 | Suryavanshi | ......... | H04L 51/18 455/414.1 |
| 2015/0124588 A1* | 5/2015 | Hallenstal | ......... | H04L 65/1016 370/221 |
| 2015/0229778 A1* | 8/2015 | Sharma | ............ | H04M 15/61 455/406 |
| 2015/0230199 A1* | 8/2015 | Jeong | ............ | H04W 28/0268 455/458 |
| 2015/0334135 A1* | 11/2015 | Le Rouzic | ......... | H04L 65/1016 455/445 |

* cited by examiner

NETWORK RESOURCE PRIORITIZATION FOR MOBILE TERMINATION SERVICES

CROSS REFERENCE TO RELATED APPLICATIONS

This application claims priority to European Patent Application No. 14 188 075.7 filed on Oct. 8, 2014, the disclosure of which is incorporated by reference herein in its entirety.

FIELD OF THE INVENTION

The present invention relates to a method for enabling network resource prioritization of mobile terminating services of a user in a network, whereby the network comprises an evolved packet core (ePC) network, an IP multimedia system (IMS) network and at least one network element for aggregating information from messages transmitted in the network.

The present invention further relates to a method for network resource prioritization of mobile terminating services of a user in a network, whereby the network comprises an evolved packet core network, an IP multimedia network and at least one network element for aggregating information from messages transmitted in the network

BACKGROUND

Furthermore the present invention relates to a network element for network resource prioritization.

Voice over Long Term Evolution—(VoLTE), Rich Communication Services (RCS) and other IP Multimedia Services are characterized by different set up or delay times in a telecommunications network. According to the telecommunication standards for 3GPP the VoLTE-Services, Rich Communication Services and other IMS Services use the same signalling bearer and are handled with the same paging policy for mobile terminating services in a LTE telecommunications network. In the 3GPP standards the current network elements like in the evolved packet core (EPC) and in the IP Multimedia system (IMS) are unable to identify different services such as a VoLTE-Service from a web service request. In the known procedures for mobile terminating services a P-Gateway (PGW) or Mobility Management Entity (MME) in the ePC is not able to distinguish a certain service like a VoLTE-service or IMS-service when receiving a mobile terminating request. Therefore no proper resource handling is possible according to the existing policies.

In some prior art telecommunications networks two IMS systems and only one Evolved Packet Core (EPC) system are in place. One IMS system could support the 3GPP Volte over IMS services and the other IMS system is in charge for handling the other GSMA Rich Communication Services (RCS) over IMS. The VoLTE services are a kind of replacement of the GSM/UMTS voice service as a real-time service, whereas the RCS provides mainly the non-real-time services such as Chat (one-to-one and Group), file transfer, content sharing etc.

With the deployment of both the Rich Communication Service and the Voice over LTE running over an IP Multimedia Subsystem, the network elements in the EPC network like the Mobility Management Entity or the P-Gateway are unable to identify the type of the services upon receiving a mobile terminating (MT) request, because a single channel/bearer is designed only and then allocated by the ePC for the IMS signalling according to 3GPP. Therefore, a proper network resource handling for the different mobile terminating services is impossible, e.g. allocating the paging area, assigning the paging retransmission policy, providing a higher paging priority and the resource for the VoLTE.

In the prior art a method for paging prioritization for IMS voice services is known. The Call Session Control Function (P-CSCF) in the IP multimedia system is responsible for executing this known procedure. The P-CSCF determines whether a downlink packet sent on the IMS bearer signal is subject to a different paging policy. If a different paging policy is required the P-CSCF informs the EPC by sending a message on the IP layer containing a specific DSCP value, which is configured in the P-CSCF. DSCP means Differentiated Service Code Point and is a specific field in an IP packet that enables different levels of service to be assigned to network traffic. This DSCP value is received by the EPC, e.g. PGW or MME on the IMS signalling bearer and triggers the decision in the EPC if a different paging is granted or not. Using this DSCP value is disadvantageous because intermediate routers between the P-CSCF and the PGW might rewrite it. Therefore a "wrong" value, which is different from the originally assigned one, could cause a misinterpretation in executing the necessary paging in the EPC, e.g. the MME.

SUMMARY

Therefore it is an object of the present invention to avoid the drawbacks in the prior art and to provide network resource prioritization in a network, which allows to identify the various different network services and to improve the network resources handling for mobile terminating services in a network.

The object is achieved by a method for enabling network resource prioritization of mobile terminating services of a user in a network is provided, whereby the network comprises an evolved Packet Core network, an IP multimedia system network and at least one network element for aggregating information from or out of messages transmitted in the network, especially for aggregating information from or out of messages from and to the evolved Packet Core network and/or IP multimedia system network, comprising the steps receiving a request message via an interface of the network element, selecting a service information from the received request message, allocating a service type according to the selected service information, especially according to an allocation matrix, assigning a priority indicator for the allocated service type, converting the assigned priority indicator into a first identifier, creating a value by assembling the first identifier and a second identifier and sending an answer message containing the created value via the interface.

The term "network element" used in context of the present invention means especially a facility or equipment used in the provision of a service such as a telecommunications service. A network element includes features, functions, and capabilities that are provided by means of such facility or equipment, including subscriber numbers, databases, signalling systems, and information sufficient for billing and collection or used in the transmission, routing, or other provision of a service.

The invention involves the idea that a single network element performing the method enables network resource prioritization for terminating services by differentiating various services according to their service typification and by enabling the network elements in the network to execute the network resource prioritization by a prioritized paging procedure. This allows an easy, flexible control when applying network resource prioritization for mobile terminating services, such as Voice over LTE (VoLTE) and/or Rich Communication Services and/or other IP Multimedia Subsystems services. Using the method the user awareness is considered comparing the set up time of a VoLTE-call with the set up time of a Web service. This comparison provides a different paging profile for a VoLTE call and/or the paging of a non-VoLTE service, e.g. Web service. Because mobile network users are very sensitive to the time taken to set up a real-time voice call, by using the method for real-time and/or non-real-time services in a packet network the method positively impacts a short call set up time.

Using the method, an incoming request message or query is analysed to decide whether a mobile terminating service is subject to network resource prioritization. The prioritization information is conveyed to the ePC network, especially to the MME or PGW via the standardized interfaces. This allows an early identification of different services for network resource prioritization.

The service information is selected from the session description (SDP) of the request message, such as the name of the service requested by the user (e.g. P-Preferred-Service). Using the method, a service type is allocated to the selected service based on a categorization according to an allocation matrix. This matrix comprises possible network services, e.g. VoLTE or RCS or other IMS services, and the corresponding service types. Applying this matrix in combination with using an algorithm in the network element provides the priority indicator assigned to the allocated service type of the terminating service. The priority indicator is converted into a first identifier. The first identifier is a bit code in relation to the corresponding priority indicator. This allows in a simple procedure inserting the priority indicator into this identifier. A second identifier is randomly generated by the network element and assembled with the first identifier creating a value. This value comprises code values, types or possible flag values. Furthermore, the value may be encrypted. The value describes which service feature it is applicable to.

In another embodiment an allocation matrix is applied when allocating a service type according to the selected service information.

An allocation matrix is a software-based tool, which is structured in such a way that for a given service description or service information a service type related to this given information can be allocated in the allocation matrix, e.g. a name of service in the session description of a SIP invite message. The matrix structure is set up as follows

| Service type | Priority indicator | First identifier |
|---|---|---|
| ...a... | ...b... | ...c... |
| ...d... | ...e... | ...f... |

In another embodiment assembling the first identifier and the second identifier into a sequence creates the value. This allows easy allocating of the priority indicator in the assembled identifier. The identifier is a bit code of a certain length. The sequence of the identifiers provides an easy and fast allocation of the first identifier or second identifier because of the specified position of the identifier, such as the first identifier.

In another embodiment the first identifier is located as the most significant bits in the AVP.

Placing the first identifier as the most significant bits allows easy allocating of the priority indicator by network elements or network elements using the method. As a further alternative it is possible to locate the first identifier as the least significant bits in the AVP or at any other location in the assembled identifier, where an easy and fast allocation of the priority indicator in the AVP is possible.

In another embodiment the value is an attribute-value pair (AVP). An attribute-value pair is a data representation in computing systems, networks or applications and may be expressed as a collection of tuples <attribute name, value>. An AVP can be used within the Diameter protocol to convey a specific set of indicators or parameters between network elements in a telecommunications network. The Diameter protocol provides an Authentication, Authorization and Accounting (AAA) framework for applications such as network access or IP mobility. AVPs may be added arbitrarily to Diameter messages as long as the required AVPs are included. With the AVP used in the method it allows conveying the decided network resource prioritization as a priority indicator from a network element, such as the PCRF, to the executing network element responsible for executing the prioritized paging procedure, e.g. the MME.

In another embodiment the attribute-value pair is the Access-Network-Charging-Identifier AVP.

The Access-Network-Charging-Identifier AVP (ANCI-AVP) is an already defined AVP according to the state of the art. Using the method the ANCI-AVP is re-used to convey the priority indicator to the ePC. The AVP is a randomly generated 64-bit code containing charging relevant information such as a charging id. Therefore no new AVP has to be defined and configured in the networks to transmit the decision regarding the network resource prioritization, such as the priority indicator. Re-using the ANCI-AVP has a low impact on the existing network, which means no new network element or hardware has to be implemented. Furthermore, re-using the existing AVP can be easily implemented by a software update to generate and transmit the priority indicator. Based on the standards procedures and on diameter protocol the encapsulated priority indicator in the ANCI-AVP is transmitted to the requesting network element, PCSCF or PGW, in the AAA-message. In the further process the priority indicator can be found in the P-Charging vector of a SIP message after a translation of the ANCI-AVP from diameter to SIP.

In another embodiment the mobile terminating services are Voice over LTE (VoLTE) services and/or Rich Communication Services and/or other IMS Services.

Using the method, VoLTE Services can be differentiated from RCS services and consequently after this identification a different network resource prioritization or priority indicator can be assigned for these mobile terminating services.

In another embodiment the network element is the Policy Charging Rules Function (PCRF). The Policy and Charging Rules Function (PCRF) is a network element of the network architecture that aggregates information to and from the network, operational support systems, and other sources in real time, supporting the creation of rules and then automatically making policy decisions for each user or subscriber active on a telecommunications network. Using the method, the PCRF allows applying of a tight, centralized and flexible prioritization policy for mobile terminating services. Because of the central role of the PCRF it is advantageous relating the priority indicator to the charging id. Furthermore using the PCRF as a central network element in the network does not impact the existing IMS network.

In another embodiment the interface is the Rx or Gx reference point. Using the Rx reference point allows simple and secure communication using a standardized protocol. Furthermore, it allows an early identification of a service type because already the first request message received by the network element is analysed for such service information. The allocating and assigning procedure for enabling network resource prioritization is initiated centrally and provides an accelerated decision for the paging priority of a mobile terminating service because of the priority handling.

Using the Gx reference point allows communication using a standardized protocol. The PGW only queries the network element, such as a PCRF, if the PGW is enabled to execute the request. A flag in the PGW is necessary for enabling the request procedure to the network element. Such a flag or function needs to be pre-configured in the gateway for enabling the method via the Gx reference point. The flag is realised by a bit, while a "1" stands for "enabled" and a "0" (Zero) indicates "not enabled". Using the method with support of the Gx reference point allows decentralizing the network resource prioritization or paging priority because PGWs are located in different cities, regions or countries. Such a decentralized prioritization does also allow a time-limited prioritising in telecommunication networks in case of network congestions in a certain city, region or country. While for example in one region the inventive method is enabled in all other regions it is disabled. Therefore, it is a further advantage that the policy does not need to be adapted or re-configured when changing the prioritization policy.

In another embodiment the priority indicator is assigned by allocating the service type and a user parameter, whereby the network element selects the user parameter from the subscriber profile repository (SPR). A user parameter contains information about the user or subscriber, which does not change and therefore is a static parameter or static user parameter. Such a user parameter selected from the subscriber user repository indicates a user or subscriber grade like a gold, silver or bronze status. This allows identifying different subscriber grades and consequently prioritizing network resources according to the identified subscriber grade. This allows enabling a preferred service handling for a certain user or subscriber in a telecommunications network because the prioritised service is terminated faster for higher subscriber grades. The SPR uses the Sp reference point as a communication interface. Consequently, when using the method, the user parameter is transmitted via this interface.

For network resource prioritization the present invention further suggests a method for network resource prioritization of mobile terminating services of a user in a network, whereby the network comprises an evolved packet core (ePC) network, an IP multimedia (IMS) network and a network element, whereby the network element aggregates information from messages from and to the ePC and/or IMS network, comprising the steps transmitting a message containing a priority indicator from a first network element to a second network element and initiating a prioritized paging for the mobile terminating service of the user based on the received priority indicator by the second network element.

The invention further involves the idea that based on the decision-making in the network element for enabling the network resource prioritization the network element responsible for paging initiates a prioritized paging for the mobile terminating service. By analysing the content of the received message and allocating the priority indicator in the message the network element prioritizes the paging request from the message for the terminating service.

When determining which terminating service or which terminating device to page and the type of paging to use, paging requests are placed in a queue as they arise from the network.

Normally, the next paging request taken from the queue is the request with the highest priority. If the queue contains more than one paging request then the request that has been in the queue for the longest time is taken.

Using the method, the network element changes the paging procedure by choosing the prioritized request from the received request message and handles it as the next or first paging request to execute. Therefore, overriding the normal paging procedure.

In another embodiment the priority indicator is contained in an information element (IE) in the received message.

In another embodiment the information element (IE) is a paging priority information element or a private extension information element.

In another embodiment the received message is a data downlink notification message.

In another embodiment the network element is a MME.

The received message is a downlink data notification from the PGW. The notification message contains information elements to transmit different types of information such as which device or user equipment (UE) to page.

The transmission of the information of either a service type or a priority indicator from the PGW to the MME can be carried out by reusing the existing Private Extension IE or by introducing a new IE, which is called paging priority IE. This allows conveying the decision of the network resource prioritization by the network element to the network element responsible for paging. Furthermore, by using the information element format the network element is able to allocate the assigned priority indicator and change the prioritization of the request.

In another embodiment said network element is enabled according to the present invention.

According to an aspect of the present invention a network element for network resource prioritization is provided characterized by a logic module for network resource prioritization.

The invention involves the idea to provide a logic module for network resource prioritization. A logic module for network resource prioritization is a software component embedded in a network element. The module is pre-defined or pre-configured by a service provider or a network operator. The configuration data in the module comprises rules and policies, e.g. which network elements are enabled when using the method and where to implement the rules in a network element in a network.

In another embodiment the network element is characterized in that the logic module comprises an allocation matrix for assigning a priority indicator.

The allocation matrix is advantageous because it is a software-based configuration or tool allowing simple and flexible network operations. For example, it is easy to change the allocation matrix in the software tool to update the priority settings in the matrix for different services based on new requirements or a new situation in the network, especially for mobile terminating services.

In another embodiment the network element is adapted to perform the method steps according to the present invention performed by such an inventive element.

The aforementioned and other aspects of the invention will be apparent from and elucidated with reference to the embodiments described hereinafter making reference to the accompanying drawings.

DETAILED DESCRIPTION

Figure 1:
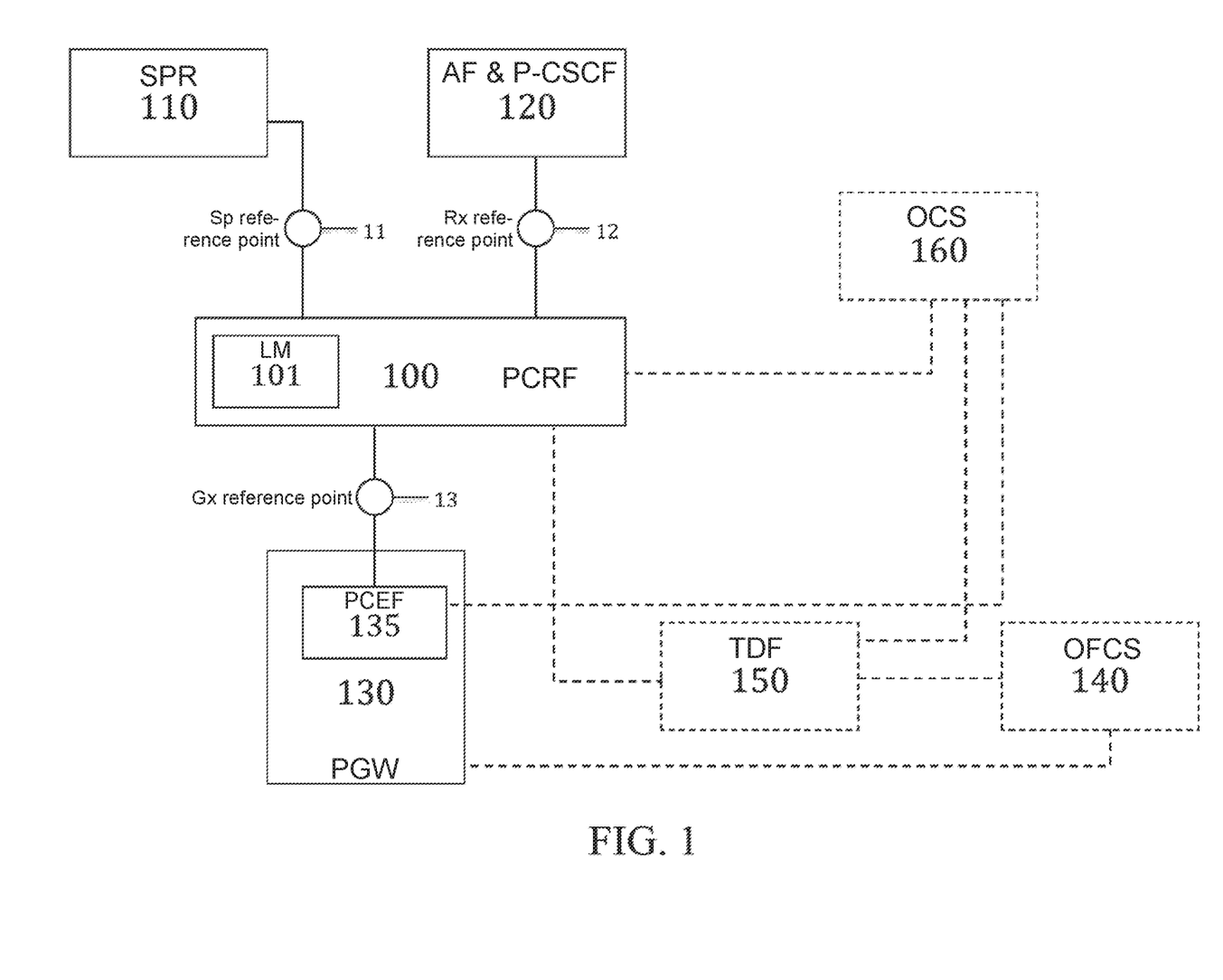
FIG. 1 is a schematic block diagram of a Policy Charging and Control architecture in a network according to the present invention.

FIG. 1 is a schematic block diagram of the Policy Charging and Control architecture in which network elements and interfaces such as reference points are shown, which are involved in the policy procedures and used in the communication between the network elements according to the present invention.

The PCRF 100 is the Policy and Charging Rules Function and is the central part of the network architecture that aggregates information to and from the network, operational support systems, and other sources in real time, supporting the creation of rules and then automatically making policy decisions for each user or subscriber active on a telecommunications network. The PCRF 100 accesses subscriber databases in a centralized manner such as a SPR 110 and other specialized functions, such as a charging system. The PCRF 100 designates in real-time to determine policy rules in a multimedia network.

The logic module for network resource prioritization 101 is located within the PCRF 100 and is realized as a software component or software based tool. This module 101 comprises an allocation matrix, which is used as an algorithm. The matrix is structured into categories like service type, user parameter or subscriber parameter, priority indicator, first identifier or second identifier. The service type category guides the selection of service type. With the selection of service type the logic module 101 correlates the priority indicator and consequently the first identifier. If the policy or rule defines to correlate service type and user parameter then the logic module 101 provides the appropriate indicator or identifier.

The Subscriber Profile Repository (SPR) 110 as a logical entity contains all subscribers related information needed for subscription-based policies. The SPR 100 may be combined with or distributed across other databases in the network. The SPR 100 provides subscription profile information such as subscriber's allowed services, Information on subscriber's allowed quality of service (QoS), including Subscriber's charging related information (e.g. location information relevant for charging), Subscriber category, Subscriber's profile configuration or Spending limits profile. The SPR 110 uses the Sp reference point 11 as a communication interface to the PCRF 100.

The Rx reference point 12 resides between an Application Function (AF) 120 such as a P-CSCF 120 and the PCRF 100. The Rx reference point 12 enables transport of application level session information. Such information includes, but is not limited to IP filter information to identify the service data flow for policy control and/or differentiated charging.

The Gx reference point 13 resides between the Policy Charging Enforcement Function (PCEF) 135, which is located in the P-Gateway 130 and the PCRF 100. The Gx reference point 13 enables the PCRF 100 to have dynamic control over the policy behaviour at a PCEF 135 or P-Gateway 130. This reference point 13 enables signalling policy decisions and it supports functions such as Request for decision from the PCEF 135 or P-Gateway 130 to the PCRF 100 or Provision of decision from the PCRF 100 to the P-Gateway 130.

The P-CSCF 120, which means proxy server for the Call Session Control Function uses the SIP protocol to communicate with other Application Servers (AF) or other P-CSCFs. A P-CSCF 120 uses the DIAMETER protocol to communicate via the Rx reference point 12 with the PCRF 100.

In FIG. 1 lines and blocks 140, 150 and 160 in dashed lines are for information only. They are depicting further network elements of a Policy and Charging control architecture or system mainly necessary for the relevant charging process. The Offline Charging System (OFCS) 140 is a system allowing a service provider or operator of a network to charge its users or subscribers, not in real time, after concurrently collecting resource usage and generating charging data records (CDR). The Traffic Data Function (TDF) 150 uses the Sd reference point to communicate with the PCRF 100. The TDF 150 detects and analyses data traffic in a network. The Online Charging system (OCS) 160 is a system allowing a service provider or operator of a network to charge its users or subscribers, in real time, based on service usage.

Figure 2:
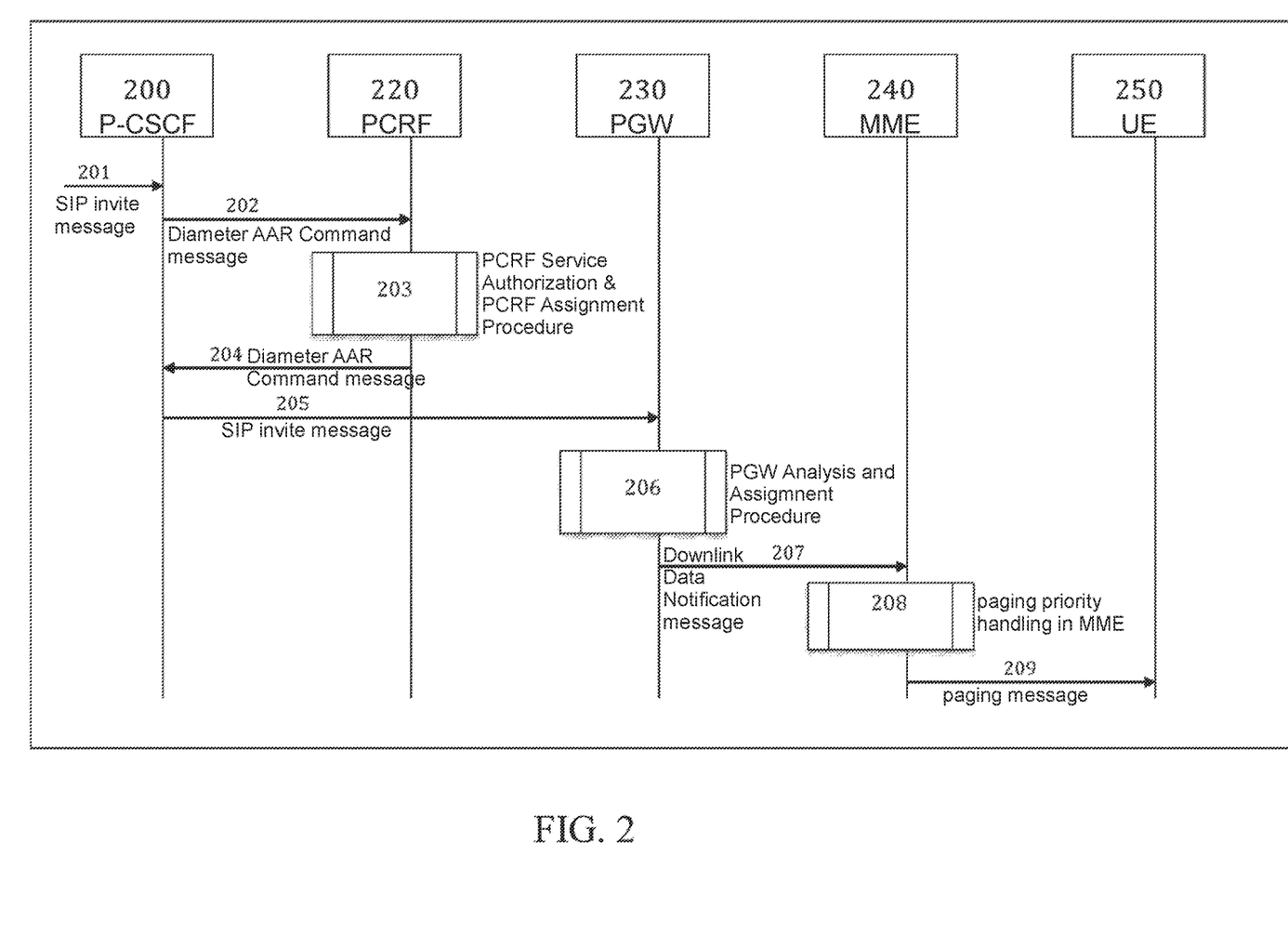
FIG. 2 is a schematic flow diagram of first embodiment of the method for network resource prioritization according to the present invention.

FIG. 2 depicts a flow diagram of a first embodiment of the method for network resource prioritization according to the present invention. The incoming SIP INVITE message 201 is a request e.g. for a RCS service or a Volte service and is received by the P-CSCF 200. The P-CSCF 200 sends service information to the PCRF 220 upon every SIP message as a Diameter request command such as an AAR command 202 for a mobile or UE terminated session. This ensures that the PCRF 100 receives proper information to perform media authorization for all possible IMS session set-up scenarios, and that the PCRF 100 is also capable of handling session modifications.

The AAR command 202 is indicated by the Command-Code field set to "265" and the 'R' bit set in the Command Flags field and has the Message Format:

```
<AA-Request> ::= < Diameter Header: 265, REQ, PXY >
    < Session-Id >
    {Auth-Application-Id}
    {Origin-Host}
    {Origin-Realm}
    {Destination-Realm}
    [Destination-Host]
    [IP-Domain-Id]
    [AF-Application-Identifier]
    *[Media-Component-Description]
    [Service-Info-Status]
    [AF-Charging-Identifier]
    [SIP-Forking-Indication]
    *[Specific-Action]
    *[Subscription-Id]
    [OC-Supported-Features]
    *[Supported-Features]
    [Reservation-Priority]
    [Framed-IP-Address]
    [Framed-Ipv6-Prefix]
    [Called-Station-Id]
    [ Service-URN ]
    [ Sponsored-Connectivity-Data ]
    [ MPS-Identifier ]
    [ Rx-Request-Type ]
    *[ Required-Access-Info ]
    [Origin-State-Id]
    *[Proxy-Info]
```

```
*[Route-Record]
*[AVP]
```

In step 203 the PCRF 220 decides by analysing the Diameter AAR message 202 sent from the P-CSCF 200 via the Rx reference point to the PCRF 220 and responds with the Diameter AAA message 204 including the assigned priority indicator in the Access-Network-Charging-Identifier AVP.

While performing the service authorization procedure 203 based on the operator policies the PCRF 220 selects service information from the session name or session description in the Media-Component-Description AVP from the received AAR 202, the PCRF 220 allocates a service type related to the selected service information according to an allocation matrix in a paging logic module and assigns a priority indicator for the allocated service type by using an algorithm in the paging logic.

The allocation matrix is set up as follows

| Service type (Session information) | User parameter (Subscription data) | Priority indicator | First identifier (using four bits of the 64 bits) |
|---|---|---|---|
| Volte | Gold membership (MO and MT) | Medium | 1110 |
| Critical communication | NA | High | 1111 |
| Non-Volte | Silver membership (MO) Gold membership (MT) | Medium-high | 0011 |
| Non-Volte | Normal membership (MT) | Low | 0001 |

If the policy or paging logic requires further information for decision making during step 203 the PCRF 220 requests user parameter such as subscription data, from the SPR 110 via the Sp reference point as depicted in FIG. 1. To achieve the network resource prioritization for the RCS and the Volte, it assigns either a priority indicator or Token. The Access-Network-Charging-Identifier AVP in the existing Diameter AAA message and the charging id is used as Token for instance. The advantage of re-using the existing charging id as the priority indicator is that there is a minimum impact on the existing network implementations like the PCRF 220 and the P-CSCF 200. The only impact is to implement a software update in the PCRF 220 to generate the priority indicator. In this way the P-CSCF 200 is able to handle the charging-ID in the ANCI-AVP and does not need to understand the semantics of the charging-ID AVP provided by the PCRF 200.

The service type and user parameter are also defined as dynamic and static factors. The service type is interpreted as a dynamic factor wherein dynamic means from the session description (SDP) like name of service. The user parameter is defined as a static factor, which means subscriber data or account data from the SPR.

In step 203 the assigned priority indicator is converted into a first identifier such as a bit code of four bits as shown in the matrix above and then assembled with a second identifier, consisting of 60 bits and which is randomly generated. The assembled identifier has a total length of 64 bits. Based on the algorithm and the embedded decision matrix in the PCRF 220 during step 203 the service type is allocated from the name of the service, a priority indicator is assigned and converted into a 4-digit bit code. Alternatively, it is also possible to use shorter or longer bit codes for the first identifier depending on the parameters or factors that should be considered. The identifier is than assembled with the second identifier. This is either performed in the PCRF 220 by putting the first identifier and the second identifier into a sequence, whereby the position of the first identifier could be at the beginning of the sequence as most significant bits of the assembled identifier or as an alternative as least significant bits. This allows an easy allocation of the priority indicator later on in the process. The priority indicator is encapsulated in the ANCI-AVP as a value for the P-CSCF 200. It is also possible to correlate the first identifier and the second identifier with a correlation factor. Correlating the two identifiers provides a further option as an information parameter for special priority cases, e.g. special customer account status and priority.

In step 204 the created value is sent as an answer message in diameter format as AAA command to the P-CSCF 200. The AAA command, indicated by the Command-Code field set to 265 and the 'R' bit cleared in the Command Flags field, is set up as follows AAA Message Format:

```
<AA-Answer> ::= < Diameter Header: 265, PXY >
    < Session-Id >
    {Auth-Application-Id}
    {Origin-Host}
    {Origin-Realm}
    [Result-Code]
    [Experimental-Result]
    *[Access-Network-Charging-Identifier]
    [Access-Network-Charging-Address]
    [Acceptable-Service-Info]
    [IP-CAN-Type]
    [Netlike-Access-Support]
    [ RAT-Type ]
    *[Flows]
    [OC-Supported-Features]
    [OC-OLR]
    *[ Supported-Features ]
    *[Class]
    [Error-Message]
    [Error-Reporting-Host]
    *[Failed-AVP]
    [Origin-State-Id]
    *[Redirect-Host]
    [Redirect-Host-Usage]
    [ Redirect-Max-Cache-Time ]
    *[Proxy-Info]
    *[AVP] .
```

The P-CSCF 200 transfers the priority indicator into the P-Charging Vector of the SIP message in step 205. The P-Charging vector header contains IMS Charging information, which is used to exchange charging data between operators or providers. This allows an easier charging process for the customers. The vector header comprises e.g. the ICID value (IM CN Subsystem Charging Identifier) and the Access Network Charging Information (ANCI). The icid value identifies connections between subscribers or users and is used by each network element, which generates connection data. The Access Network Charging Information in the P-Charging Vector header is used for correlating connection data from the access network and those from the IMS network. The priority indicator or identifier is located in this header field together with other possible authentication tokens, which will be used later on by the PGW 230. A P-Charging-Vector with Access Network Charging Information header looks as follows:

```
P-Charging-Vector: icid-value="AyretyU0dm+602IrT5zAFrbHLso="
ggsn=[5555:4b4:3c3:2d2:1e1];
auth-token=4AF03C87CA;
pdp-info= "pdp-item=1; pdp-sig=no
gcid=39B26CDE;
flow-id=({1,1},{1,2})" .
```

In step 206 the PGW 230 analyses the Access-Network-Charging-Identifier-Value included in the P-Charging-Vector header field and assigns the priority indicator or service type based on the defined allocation matrix. The defined allocation matrix allows understanding the semantics of the received identifier containing the priority indicator in the PGW 230. This matrix is pre-configured in the PGW 230 by performing a software update or patch.

In step 207 the PGW 230 includes the priority indicator in the Downlink Data Notification message in the private extension information element to transfer the network resource prioritization decision or the paging priority to the MME 240. Alternatively, the priority indicator can be included in a new information element such as paging priority information element or network resource prioritization information element.

In step 208 the MME 240 analyses the downlink data notification message 207 for a network resource prioritization decision earlier made by the PCRF 220. If a network resource prioritization is indicated the MME 240 prioritizes the network resources and arranges the paging according to the priority indicator in step 209 for the SIP INVITE request 201. The MME 240 extracts the priority indicator from the message 207 based on the defined allocation matrix, because it allows understanding the semantics of the received indicator. The allocation matrix is pre-configured in the MME 240 by performing a software update or patch.

Paging 209 the UE 250 is performed in a standard way. During this time period, the MME 240 may receive more new Downlink Data Notification messages 207 for the UE 250 and re-pages the UE 250.

Figure 3:
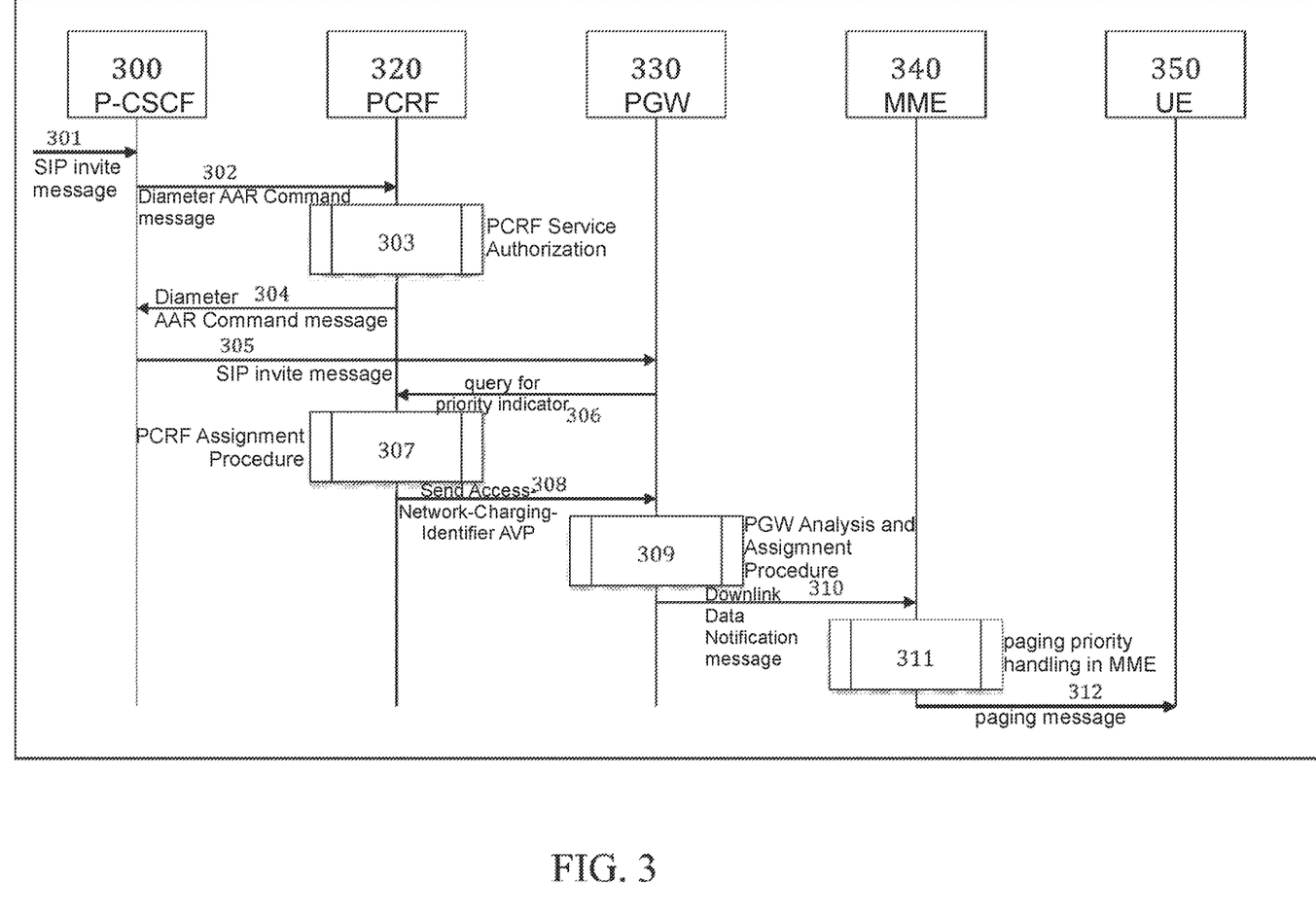
FIG. 3 is a schematic flow diagram of a further embodiment of the method for network resource prioritization according to the present invention.

The embodiment schematically depicted in FIG. 3 differs from the embodiment described before with reference to FIG. 2 in that the PGW 330 queries the PCRF 320 over the Gx reference point as already described in FIG. 1 based on the icid-value (already described in step 205 of FIG. 2) in the P-Charging-Vector header field in the SIP INVITE message 305 from the P-CSCF 300. This solution allows using the PGW 330 as a decentralized network element, e.g. located in a district, region or country. Thus, a decentralized paging concept for different areas can be applied in contrary to the centralized approach or solution depicted in FIG. 2.

Steps 301 to 305 are performed according to the 3GPP standards.

In step 306 the PGW 330 queries PCRF 320 for the priority indicator based on local policy included in the PGW 330. Step 306 is performed because the PGW 330 is enabled to execute the query. A flag in the PGW 330 is a bit value, which is a "1" for "enabled". A value of "0" (Zero) indicates a status "not enabled" and would not trigger the query in step 306.

In step 307 like in step 203 of FIG. 2 the PCRF 320 assigns the priority indicator, converts the indicator into an assembled identifier and encapsulates it as a value in the Access-Network-Charging-Identifier-Value AVP.

In step 308 the PCRF 320 sends the Access-Network-Charging-Identifier AVP including the identifier or priority indicator in the AAA response similar to step 204 in FIG. 2.

In Step 309 and step 310 of FIG. 3 the PGW 330 performs the similar procedure as described in step 206 and step 207 of FIG. 2.

Steps 311 and 312 executed by the MME 340 and executed between the MME 340 and the UE 350 are performed similar to steps 208 and 209 as described in FIG. 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

LIST OF REFERENCES

Sp reference point
Rx reference point
Gx reference point
100 Policy and Charging Rules Function (PCRF)
101 Logic Module for Network Resource Prioritization (LM)
110 Subscription Profile Repository (SPR)
120 Application Function (AF); Proxy Call Session Control Function (P-CSCF)
130 Proxy Gateway (PGW)
135 Policy and Charging Enforcement Function (PCEF)
140 Offline Charging System (OFCS)
150 Traffic Detection Function (TDF)
160 Online Charging System (OCS)
200 Proxy Call Session Control Function (P-CSCF)
201 SIP invite message
202 Diameter AAR Command message
203 PCRF Service Authorization & PCRF Assignment Procedure
204 Diameter AAA command message
205 SIP invite message
206 PGW Analysis and Assignment Procedure
207 Downlink Data Notification message (DDN)
208 paging priority handling in MME
209 paging message
220 Policy and Charging Rules Function (PCRF)
230 Proxy Gateway (PGW)
240 Mobility Management Entity (MME)
250 user equipment (UE); mobile, terminal
300 Proxy Call Session Control Function (P-CSCF)
301 SIP invite message
302 Diameter AAR Command message
303 PCRF Service Authorization
304 Diameter AAA command message
305 SIP invite message
307 PCRF Assignment procedure 309 PGW Analysis and Assignment Procedure
310 Downlink Data Notification message (DDN)
311 paging priority handling in MME
312 paging message
320 Policy and Charging Rules Function (PCRF)
330 Proxy Gateway (PGW)
340 Mobility Management Entity (MME)
350 user equipment (UE); mobile, terminal

What is claimed is:

1. A method for enabling network resource prioritization of mobile terminating services of a user in a network, whereby the network comprises an evolved packet core network, an IP multimedia system network and a network element for aggregating information from messages transmitted in the network comprising:
   receiving a request message via an interface of the network element,
   selecting a service information from the received request message,
   allocating a service type according to the selected service information,
   assigning a priority indicator for the allocated service type,
   converting the assigned priority indicator into a first identifier,
   creating a value by assembling the first identifier and a second identifier, wherein the second identifier is randomly generated by a network element,
   correlating the first identifier and the second identifier with a correlation factor to provide an information parameter for special priority cases, and
   sending an answer message containing the created value via the interface,
   wherein the priority indicator is assigned according to the service type and a user parameter, whereby the network element selects the user parameter from a subscriber profile repository (SPR), and
   wherein the user parameter indicates a user or subscriber grade allowing a prioritization of network resources according to the identified subscriber grade.

2. The method according to claim 1, wherein allocating of a service type according to the selected service information is performed by applying an allocation matrix.

3. The method according to claim 1, wherein the value is created by assembling the first identifier and the second identifier into a sequence.

4. The method according to claim 3, wherein the first identifier is located as the most significant bits in the sequence.

5. The method according to claim 1, wherein the value is an attribute-value pair (AVP).

6. The method according to claim 5, wherein the attribute-value pair is an Access-Network-Charging-Identifier AVP.

7. The method according to claim 1, wherein the mobile terminating services are Voice over LTE (VoLTE) services and/or Rich Communication Services and/or other IMS Services.

8. The method according to claim 1, wherein the network element is a Policy Charging Rules Function.

9. The method according to claim 1, wherein the interface is an Rx or a Gx reference point.

10. A method for network resource prioritization of mobile terminating services of a user in a network, whereby the network comprises an evolved packet core network, an IP multimedia system network and at least one network element for aggregating information from messages transmitted in the network, comprising:
   transmitting a message containing a priority indicator from a first network element to a second network element;
   initiating a prioritized paging for the mobile terminating service of the user based on the received priority indicator by the second network element, wherein the priority indicator is contained in an information element in the received message, wherein the second network element changes a paging procedure by choosing a prioritized request provided with the priority indicator from received request messages and handles it as the next paging request to execute by overriding a normal paging procedure; and
   wherein the received priority indicator is assigned according to the service type and a user parameter, whereby the first network element selects the user parameter from a subscriber profile repository (SPR);
   wherein the user parameter indicates a user or subscriber grade allowing a prioritization of network resources according to the identified subscriber grade.

11. The method according to claim 10, whereby the information element is a paging priority information element or a private extension information element.

12. The method according to claim 10, wherein the received message is a data downlink notification message.

13. The method according to claim 10, wherein the second network element is a MME.

14. The method according to claim 10, wherein said second network element is configured to perform a method comprising:
   receiving a request message via an interface of the network element,
   selecting a service information from the received request message,
   allocating a service type according to the selected service information,
   assigning a priority indicator for the allocated service type,
   converting the assigned priority indicator into a first identifier,
   creating a value by assembling the first identifier and a second identifier, wherein the second identifier is randomly generated by a network element,
   correlating the first identifier and the second identifier with a correlation factor to provide an information parameter for special priority cases, and
   sending an answer message containing the created value via the interface, wherein the priority indicator is assigned according to the service type and a user parameter, whereby the second network element selects the user parameter from a subscriber profile repository (SPR).

15. A network element for network resource prioritization, the network element comprising:
   a logic module for network resource prioritization, wherein the logic module comprises an allocation matrix containing a service type and a user parameter selected from a subscriber profile repository (SPR) for assigning a priority indicator, wherein the user parameter indicates a user or subscriber grade allowing a prioritization of network resources according to the identified subscriber grade;
   whereby the network element is adapted to aggregate information from messages transmitted in a network and to:
      receive a request message via an interface of the network element, select a service information from the received request message, allocate a service type according to a selected service information, assign a priority indicator for an allocated service type, convert an assigned priority indicator into a first identifier, create a value by assembling the first identifier and a second identifier, wherein the second identifier is randomly generated by a network element, correlate the first identifier and the second identifier with a correlation factor to provide an information parameter for special priority cases, and send an answer message containing the created value via the interface, wherein the priority indicator is assigned according to the service type and a user parameter, whereby the network element selects the user parameter from a subscriber profile repository (SPR).

\* \* \* \* \*